(12) United States Patent
Willemin et al.

(10) Patent No.: US 7,199,368 B2
(45) Date of Patent: Apr. 3, 2007

(54) DEVICE FOR DETECTING THE CROSSING OF A ROAD MARKING FOR MOTOR VEHICLE

(75) Inventors: Michel Willemin, Preles (CH); Andreas Hirt, Orpund (CH)

(73) Assignee: EM Microelectronic-Marin SA, Marin (CH)

( * ) Notice: Subject to any disclaimer, the term of this patent is extended or adjusted under 35 U.S.C. 154(b) by 101 days.

(21) Appl. No.: 10/522,317

(22) PCT Filed: Jul. 8, 2003

(86) PCT No.: PCT/EP03/07326

§ 371 (c)(1),
(2), (4) Date: Jan. 25, 2005

(87) PCT Pub. No.: WO2004/013653

PCT Pub. Date: Feb. 12, 2004

(65) Prior Publication Data

US 2005/0231389 A1 Oct. 20, 2005

(30) Foreign Application Priority Data

Jul. 25, 2002 (EP) .................................. 02078059

(51) Int. Cl.
*G01J 5/02* (2006.01)
(52) U.S. Cl. .................. 250/341.8; 250/348; 340/942; 340/901
(58) Field of Classification Search ............. 250/341.8, 250/341.7; 340/435, 901
See application file for complete search history.

(56) References Cited

U.S. PATENT DOCUMENTS

| 3,201,750 | A | * | 8/1965 | Morin | ........................ 340/904 |
| 3,739,179 | A | | 6/1973 | Krekow | |
| 3,881,568 | A | * | 5/1975 | Ando et al. | .................. 180/168 |
| 4,348,652 | A | * | 9/1982 | Barnes et al. | ................ 340/904 |
| 5,225,827 | A | * | 7/1993 | Persson | ...................... 340/904 |
| 5,463,384 | A | * | 10/1995 | Juds | .......................... 340/903 |
| 5,568,137 | A | * | 10/1996 | Liu | ............................ 340/905 |
| 6,038,496 | A | | 3/2000 | Dobler et al. | |
| 6,317,202 | B1 | | 11/2001 | Hosokawa et al. | |
| 6,741,186 | B2 | * | 5/2004 | Ross | .......................... 340/901 |
| 7,012,509 | B2 | * | 3/2006 | Riat | .......................... 340/435 |
| 2002/0175813 | A1 | * | 11/2002 | Ross | .......................... 340/555 |

FOREIGN PATENT DOCUMENTS

| EP | 0049722 A1 | 4/1982 |
| FR | 2637715 | 4/1990 |

OTHER PUBLICATIONS

International Search Report, completed Oct. 27, 2003.

* cited by examiner

*Primary Examiner*—Albert Gagliardi
(74) *Attorney, Agent, or Firm*—Griffin & Szipl, P.C.

(57) ABSTRACT

The present invention concerns a device for detecting crossing of a horizontal land demarcation marker of a carriageway for motor vehicles, characterized in that it includes at least one box (2) to be placed under the vehicle and enclosing means for projecting two light beams (4, 6) onto the carriageway (8) in two distinct zones (10, 12) that do not overlap, and distinct means for picking up each of the two light beams (14, 16) after reflection onto the carriageway (8).

30 Claims, 4 Drawing Sheets

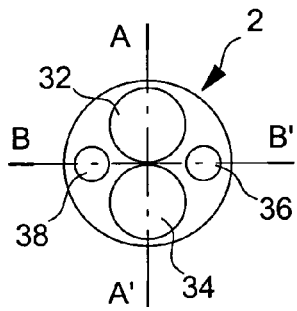 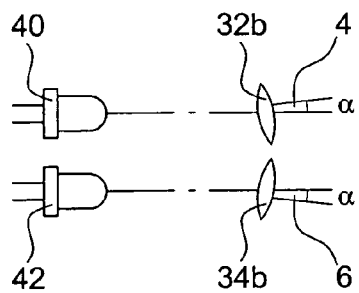 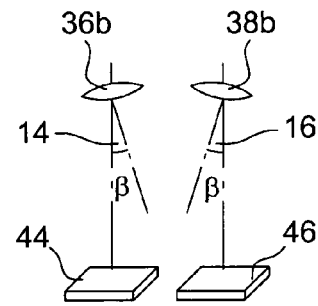
Fig.7a  Fig.7b  Fig.7c
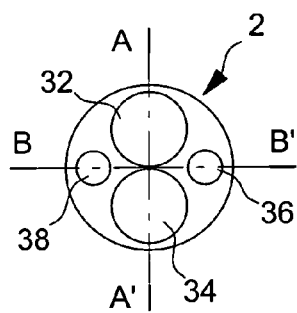 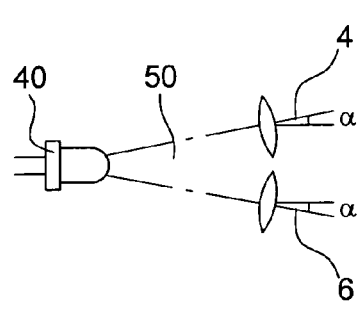 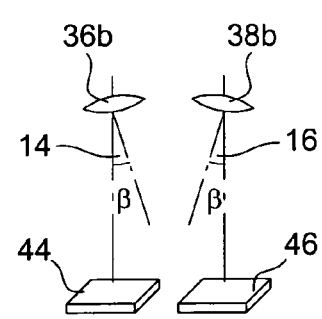
Fig.8a  Fig.8b  Fig.8c
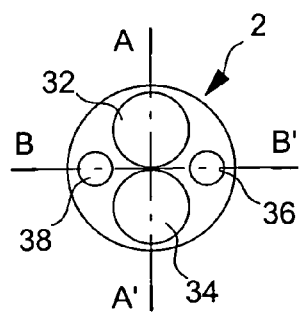 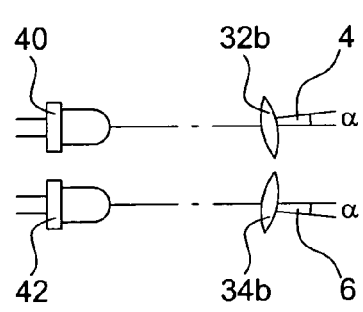 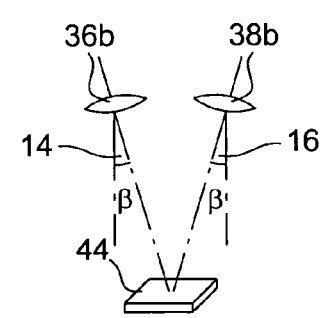
Fig.9a  Fig.9b  Fig.9c

DEVICE FOR DETECTING THE CROSSING OF A ROAD MARKING FOR MOTOR VEHICLE

This is a National Phase Application in the United States of International Patent Application No. PCT/EP03/07326 filed Jul. 8, 2003, which claims priority on European Patent Application No. 02078059.9, filed Jul. 25, 2002. The entire disclosures of the above patent applications are hereby incorporated by reference.

FIELD OF THE INVENTION

The present invention concerns a device for detecting crossing of a marker line on the ground separating lanes for motor vehicles.

BACKGROUND OF THE INVENTION

It may happen that a motorist, driving for example on the right lane of a highway, inadvertently encroach on the left lane crossing the marker line which separates the two lanes. This may create a dangerous situation, in particular when another vehicle is overtaking. Likewise, the motorist may also encroach on the hard shoulder for emergency use and cross the marker line that separates the right lane of the highway from said hard shoulder for emergency use. This can also create a dangerous situation, particularly when another vehicle is stationary on the hard shoulder for emergency use.

In order to warn the motorist of the dangerous situation awaiting him, it has already been proposed to replace the conventional marker lines, which are smooth with rough marker lines. When the wheels of a motor vehicle encroach on such rough marker lines, they produce a characteristic sound audible inside the passenger space of the vehicle, which tells the driver that he is drifting from his path. The noise stops as soon as the driver has corrected his path and returned to his lane.

The appearance of rough marker lines constituted real progress in road safety. Unfortunately, given the extent of road networks, not all roads can be fitted with such marker lines. Moreover, the noise produced by the wheels of the motor vehicle when they encroach on a rough marker line can be concealed by the noise of the engine or the sound of the car radio, so that the driver cannot be informed of the dangerous situation that he is in.

In order to overcome the drawbacks of passive security systems such as rough marker lines, car manufacturers have proposed active security systems on board the vehicles. Tests have thus been carried out with the aid of a camera installed under the vehicle and filming continuously the carriage way that passes in front of the vehicles's wheels. Such a system requires, however, a complex computer device to be able to analyse the images generated by the camera and to detect crossing of a separation line, which makes it particularly expensive and difficult to implement.

Another known active security system includes a multiplicity of infrared transmitters associated with photo-sensors and disposed under the front bumper face-bars of the motor vehicle. Each sensor of this system is formed of a master box comprising a transmitter and a receiver, and a slave box also formed of a transmitter and a receiver, which enables the electronics to be shared so as to be able to phase shift transmissions and prevent cross-talk of the sensors. In a preferred embodiment of this system, seven double sensors, i.e. seven pairs of master and slave boxes, are disposed at regular intervals from each other under the vehicle so as to cover the entire width of said vehicle.

The object of the system described hereinbefore is not to anticipate detection of a lateral drift of the vehicle, but to generate an alarm from the moment that one of the wheels of said vehicle crosses a horizontal lane demarcation marker. Thus, the transmitters each emit an infrared light beam towards the carriageway. These infrared light beams are then reflected on the ground and directed towards the photo-sensors which, as a function of the quality of the reflected light, are capable of determining whether the light was reflected on the carriageway surface (for example concrete) or on a white strip of horizontal marking. As a function of the information collected by this system and the state of the vehicle (speed, whether there is prior indication of a manoeuvre by switching on turn signals or blinkers), said system actuates one or other of two vibrators located under the driver's seat to indicate to him that he is crossing a horizontal lane demarcation marker to the right, or respectively to the left.

The path monitoring system described hereinbefore has the advantage of quickly informing the driver of significant drifts in the path of his vehicle with respect to his lane on the carriageway, the causes of such drifts being varied: drowsiness, reduced vigilance, distraction. Such a system is less expensive than a system using a path-follower camera, but remains nonetheless relatively complex to implement. In fact, this system includes no less than fourteen master and slave boxes, which makes cabling of the system particularly complex and considerably increases the assembly time and number of parts necessary for assembly under the vehicle's bumper face-bar. This multiplication of the number of elementary sensors also raises the problem of the long-term reliability of such a system. Moreover, a double sensor formed of a master box and a slave box forms an indissociable unit insofar as the operating features of the master box are calibrated with respect to those of the slave box. Thus, in the event of a failure in a double sensor following a breakdown or damage to the front bumper face-bar, the master and slave boxes have to be replaced simultaneously. Consequently, the master and slave boxes have to be stored in pairs, which raises inevitable problems of stock management.

It is an object of the present invention to overcome the aforementioned problems in addition to others still, by providing a system for monitoring the path of a motor vehicle, which enables, in particular, the number of parts used to be limited.

SUMMARY OF THE INVENTION

The present invention thus concerns a device for detecting crossing of a horizontal lane demarcation marker of a carriageway for motor vehicles, characterized in that it includes at least one box to be disposed under the vehicle, and enclosing means for projecting two light beams on the carriageway in two district zones that do not cover each other, and distinct means for picking up each of the two light beams after reflection on the carriageway.

Owing to these features, the present invention regroups the master and slave functions of the double sensors of the prior art in a single box, which considerably simplifies the wiring of such a system and allows substantial savings to be made, particularly in terms of the number of securing parts and the assembly/dismantling time. Moreover, the boxes according to the invention are interchangeable, which considerably simplifies the stock management of such boxes.

According to a first embodiment, the present invention concerns a detection device of the type described hereinbefore, characterized in that the at least one box, having a general axis of symmetry, encloses a single light source, transmitting a primary light beam in the direction of the carriageway, and at least one photo-sensor for detecting the light after reflection on the carriageway, two first optical devices whose optical axes are inclined at a first value with respect to the general axis of symmetry of the box being disposed on the path of the primary light beam as it exits the light source, so as to split said primary light beam into two secondary light beams guided onto the carriageway in two distinct zones, and two second optical devices whose optical axes are inclined at a second value with respect to the general axis of symmetry of the box being disposed on the path of the secondary light beams after the latter have been reflected onto the carriageway and before they reach the at least one photo-sensor.

According to a second embodiment, the present invention concerns a device of the type described hereinbefore, characterized in that the at least one box, having a general axis of symmetry, encloses two light sources each transmitting a light beam in the direction of the carriageway, and at least one photo-sensor for detecting the light after reflection on the carriageway, two first optical devices whose optical axes are inclined with respect to the general axis of symmetry of the box each being disposed on the path of one of the light beams as it exits the corresponding light source, so as to guide said two light beams onto the carriageway in two distinct zones, and two second optical devices whose optical axes are inclined at a second value with respect to the general axis of symmetry of the box being disposed on the path of the light beams after they have been reflected on the carriageway and before they reach the at least one photo-sensor.

BRIEF DESCRIPTION OF THE DRAWINGS

Other features and advantages of the present invention will appear more clearly from the following detailed description of a device for detecting motor vehicle path drift according to the invention, this example being given purely by way of non limiting illustration in conjunction with the annexed drawing, in which:

FIGS. 7a–7c are respectively schematic face and cross-sectional views along lines A–A' and B–B' of the path drift detection box according to a first embodiment;

FIGS. 8a–8c are respectively schematic face and cross-sectional views along lines A–A' and B–B' of the path drift detection box according to a second embodiment; and FIGS. 9a–9c are respectively schematic face and cross-sectional views along lines A–A' and B–B' of the path drift detection box according to a third embodiment.

DETAILED DESCRIPTION OF THE INVENTION

The present invention proceeds from the general inventive idea which consists in regrouping in a single box the master and slave elements of the double sensors of the prior art. Owing to this feature, the number of boxes to be installed under a vehicle for detecting any path drifts of the latter is halved, which allows the number of securing parts and the assembly/dismantling time to be substantially reduced. Moreover, the boxes forming the device according to the invention are interchangeable, which considerably simplifies stock management.

Figure 1:
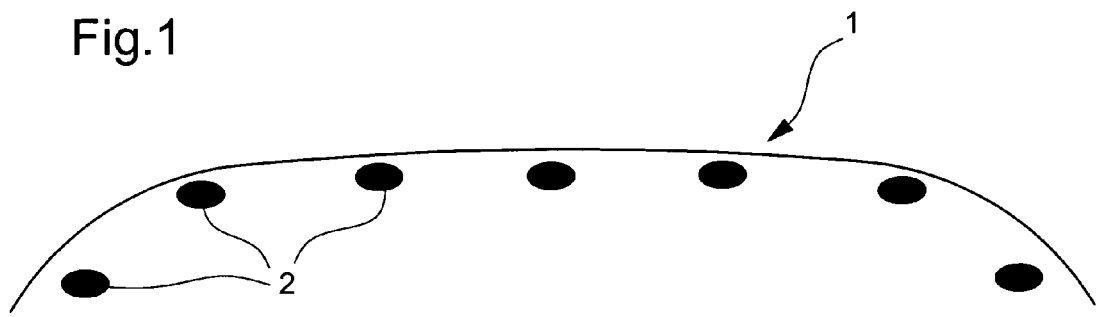
FIG. 1 is a schematic bottom view of the front bumper face-bar of a motor vehicle fitted with the path drift detection device according to the present invention.

FIG. 1 is a schematic bottom view of the front bumper face-bar of a motor vehicle (not shown) fitted with the path drift detection device according to the present invention. Designated as a whole by the general reference numeral 1, this bumper face-bar is provided with a plurality of boxes 2 disposed at substantially regular intervals along said bumper face-bar 1 so as to cover the total width of the motor vehicle fitted therewith. In the example shown in FIG. 1, boxes 2 are seven in number. It goes without saying that this example is only illustrative and that the number of boxes 2 could vary as a function, particularly, of the geometry of bumper face-bar 1 and the dimensions of the vehicle.

Figure 2:
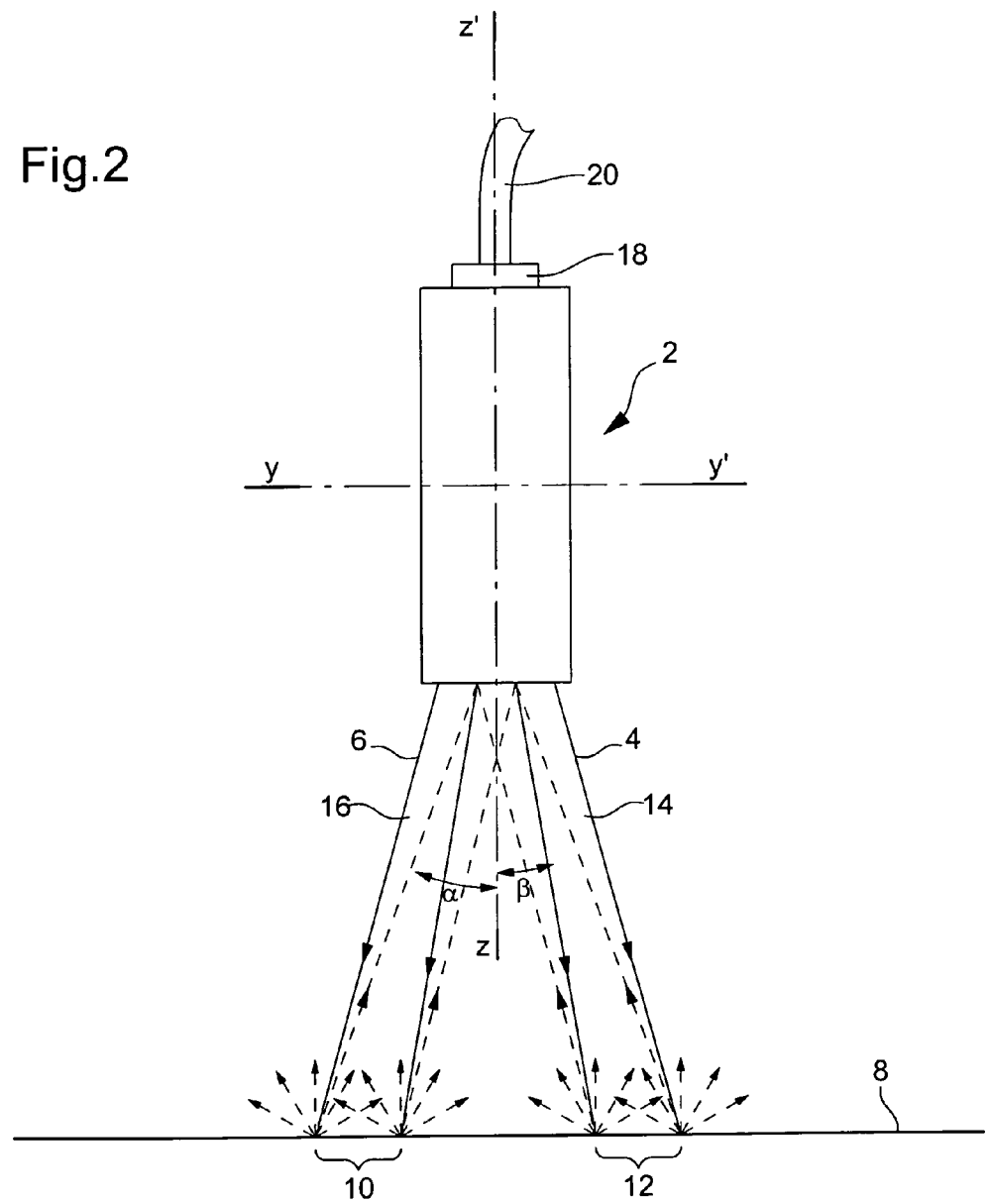
FIG. 2 is a schematic principle view illustrating the outward and return paths of the light beams originating from the detection device according to the invention and reflected by the carriageway on which the motor vehicle is being driven.

FIG. 2 is a schematic representation illustrating the outward and return paths of the light beams originating from one of boxes 2 forming the detection device according to the invention, these beams being reflected by the carriageway on which the motor vehicle is being driven. In fact, and as will be described in detail subsequently, each box 2 includes means for projecting two light beams 4 and 6 onto carriageway 8 in two distinct zones 10 and 12 that do not overlap, and means for picking up the two light beams 14 and 16 after reflection on carriageway 8.

As can be observed upon examining FIG. 2, the light beams 4 and 6 originating from box 2, and beams 14 and 16 resulting from reflection of the light on carriageway 8 are inclined at a value $\alpha$, respectively $\beta$, with respect to the general axis of symmetry z–z' of box 2, so that focussing zones 10 and 12 do not overlap, and that a light beam produced by one of the light sources does not dazzle the photo-sensor cooperating with the other light source. Preferably, but not in a limiting manner, the light beams will form with axis of symmetry z–z' of box 2, the same angle of approximately 6°. With a suitable choice of the optical features of the system (focal distances and diameter of the lenses; distance between the lenses and the photo-sensors; height of the photo-sensors with respect to the carriageway), one can guarantee that a light beam produced by one of the light sources will not be detected by the photo-sensor cooperating with the other light source.

The focussing zones 10 and 12 of the beams on the carriageway typically form light spots the diameter of which is around five centimeters. The smaller the spot on the carriageway, the better the resolution of the system. However, adjustment of the optical systems will be difficult. Conversely, the larger the light spot is, the greater the tolerance will be on the optical system alignment. But in the latter case, the resolution of the system will be less. A compromise thus has to be found. Moreover, measurement precision will be better if the spots are distributed at intervals of the most regular distance possible. It is to be noted also that at these focussing zones 10 and 12, a part of the light transmitted diffuses and thus cannot be collected by box 2. The latter includes a connector 18 extended by a cable 20, enabling it to be connected to the electronic signal processing circuits (not shown) which are on board the vehicle. Since, for reasons linked to the ergonomics of the place where box 2 has to be fixed, it is not certain that the axis of symmetry z–z' of said box 2 will be perfectly vertical, one could provide the possibility of pivoting box 2 about a horizontal axis y–y' in order to adjust its position as well as possible. Likewise, in order to prevent projections of dirt from the carriageway damaging said box 2, it is also possible to mount the latter slightly inclined with respect to the vertical.

Figure 3:
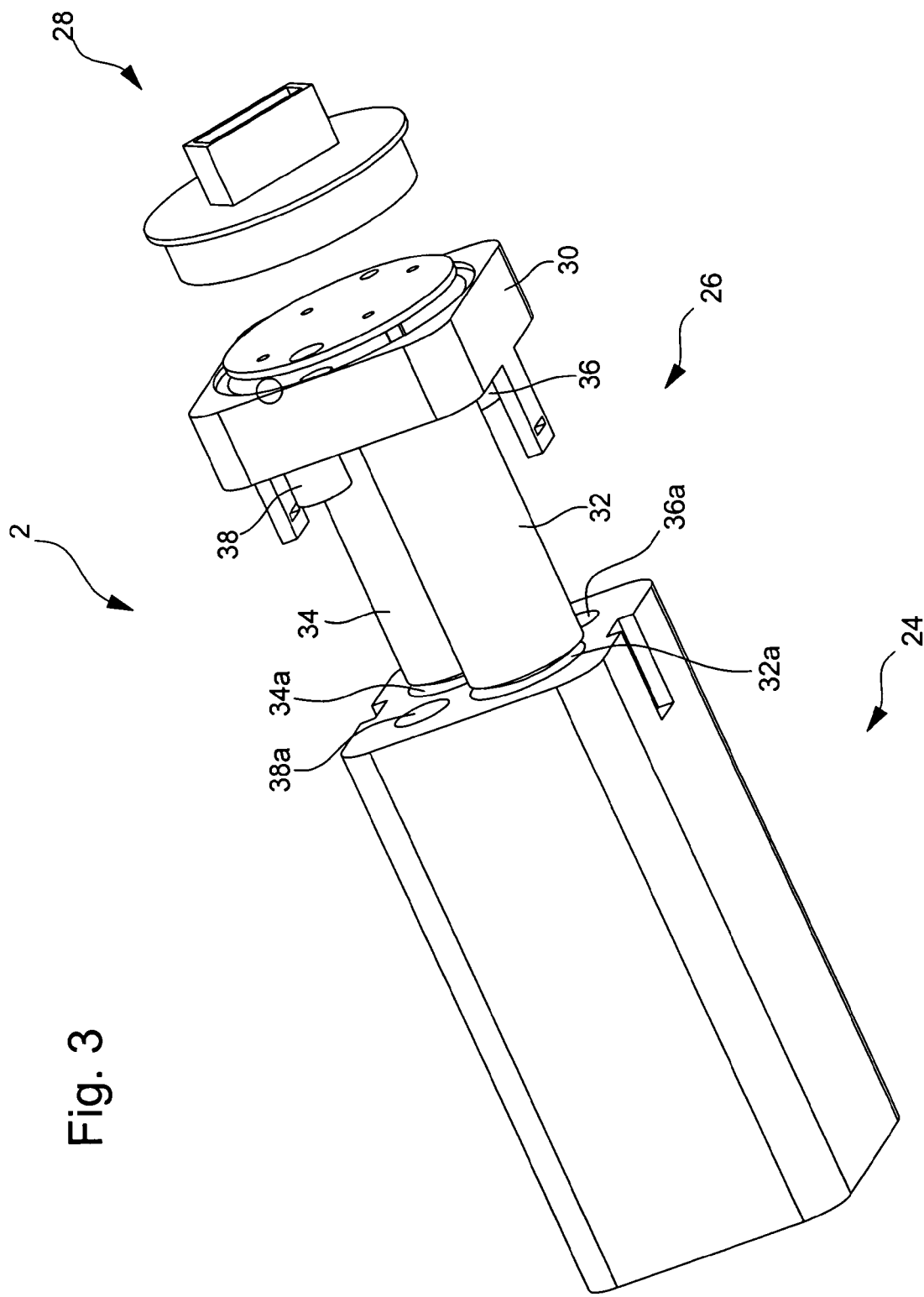
FIG. 3 is a perspective view of one of the boxes constituting the detection system according to the invention.

FIG. 3 is a perspective view of a box 2 in the disassociated state. The later is essentially formed of a solid body 24 of substantially parallelepiped shape, an optical unit 26 and a cover 28. Optical unit 26 includes a base 30 whose contour matches the general external shapes of body 24 of box 2 and on which two optical transmission tubes 32 and 34 stand and two optical reception tubes 36 and 38. The optical unit is to be inserted in body 24, which has, for this purpose, cavities 32a, 34a and 36a, 38a for respectively receiving transmission tubes 32, 34 and reception tubes 36, 38. The various elements forming box 2 according to the invention can be made of any suitable material, such as, in particular, injected or moulded plastic.

Figure 4:
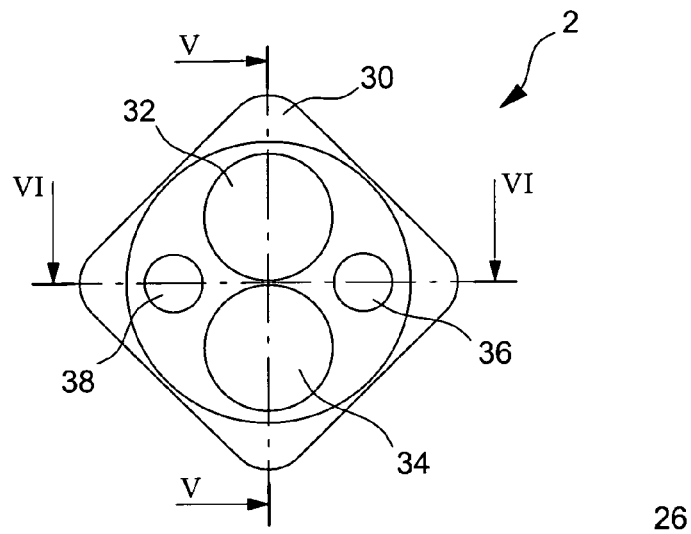
FIG. 4 is a face view of the box shown in FIG. 3.
Figure 5:
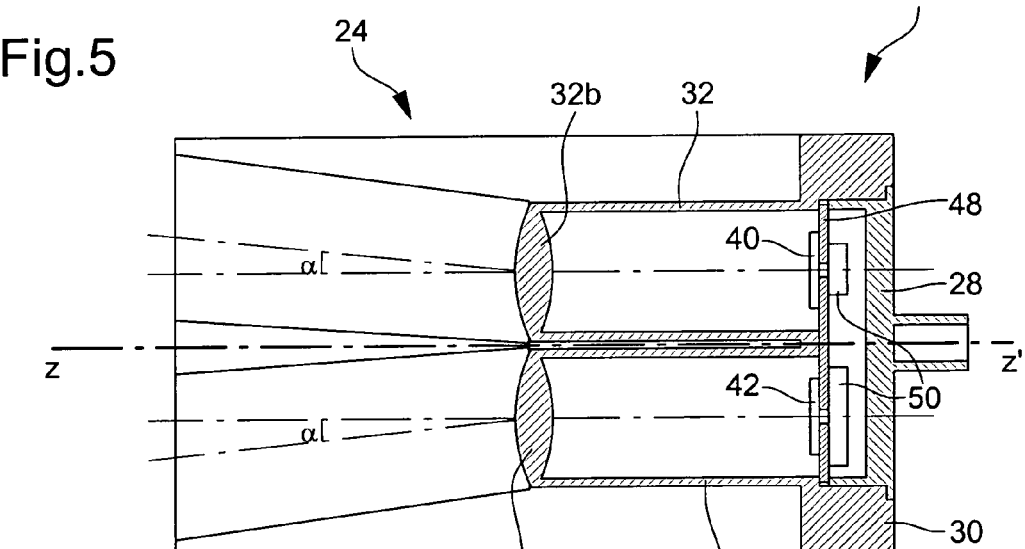
FIG. 5 is a cross-section along the line V—V of the box shown in FIG. 4.
Figure 6:
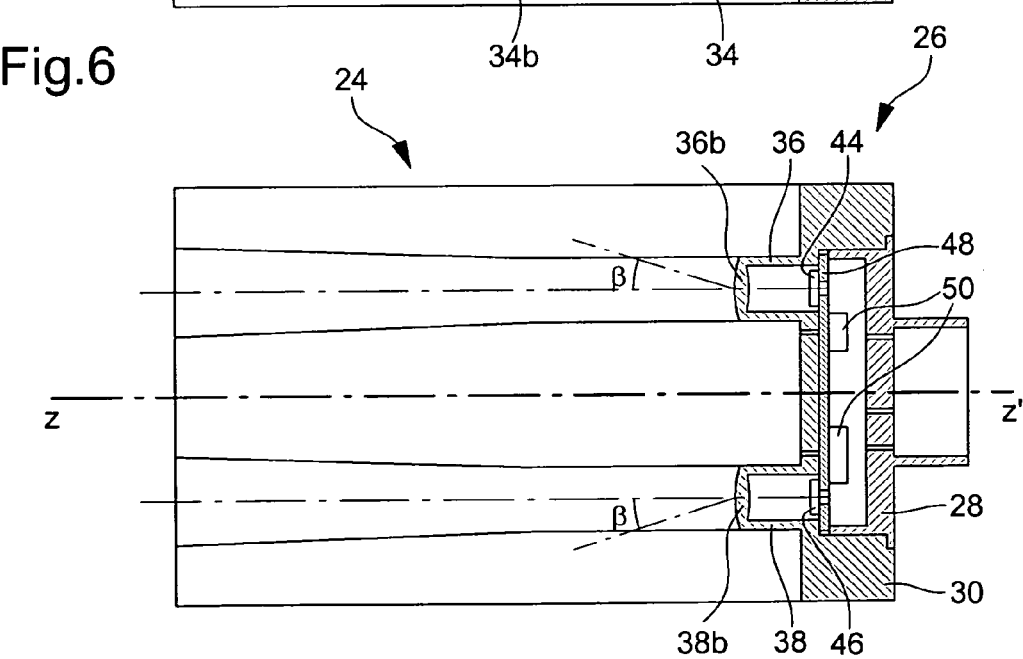
FIG. 6 is a cross-section along the line VI—VI of the box shown in FIG. 4.

FIGS. 5 and 6 are cross-sections, respectively along lines V—V and VI—VI of box 2 the front face 40 of which is shown in FIG. 4. As can be seen in these two Figures, lenses 32b, 34b and 36b, 38b are provided at the end of transmission tubes 32, 34, and reception tubes 36, 38. These lenses can be of the mineral or organic type, be mounted individually at the end of the tubes or be integral with optical unit 26. In this latter case, optical unit 26 will preferably, but not restrictively, be made by injecting a plastic material transparent to the wavelength being used and additionally able to be opaque to the undesired wavelengths. It will be understood that each optical tube can include a more complex lens system including two or several lenses.

Lenses 32b, 34b and 36b, 38b can be revolution lenses, in which case their optical axes are perpendicular to their respective entry and exit faces. These lenses then have to be mounted inclined, such that their optical axes form, with general axis of symmetry z–z' of the box, the desired angles $\alpha$ and $\beta$ respectively. Alternatively, one could also use lenses which do not exhibit axial symmetry and whose optical axes are naturally inclined at the desired value with respect to the general axis of symmetry z–z' of box 2.

Two light sources 40 and 42 are disposed at the bottom of transmission tubes 32 and 34. They are preferably, but not restrictively, two diodes emitting light in the infrared field. Likewise, two photo-receivers 44 and 46 are disposed at the bottom of the reception tubes and are used to pick up the light emitted by diodes 40 and 42 after the latter has been reflected on the carriageway. In the example shown in the drawing, diodes 40 and 42 and photo-receivers 44 and 46 are mounted at the surface of a printed circuit 48 by the well known "surface mounted device" or "SMD" technique. Electronic components 50 are mounted on the back face of printed circuit 48. According to a variant, the diodes and photo-receivers could also be flip chip bonded on printed circuit 48. In this latter case, it would, however, be necessary to make holes in the printed circuit respectively facing the diodes and photo-receivers.

FIGS. 7a–7c are schematic respectively, face and cross-sectional views, along lines A–A' and B–B', of a path drift detection box according to a first embodiment of the invention. According to this first embodiment, box 2 encloses (see FIG. 7b) two light sources 40 and 42 each emitting a light beam 4, 6 in the direction of the carriageway, and two photo-detectors 44 and 46 (FIG. 7c) for detecting the light 14, 16 after reflection on the carriageway. Two first optical devices 32b and 34b whose optical axes are inclined at a value $\alpha$ with respect to the general axis of symmetry z–z' of box 2 are each disposed on the path of one of light beams 4, 6 as it exits the corresponding light source, so as to guide said light beams 4, 6 onto the carriageway in two distinct zones. Two second optical devices 36b and 38b whose optical axes are inclined at a second value $\beta$ (which may be equal to or different from value $\alpha$) with respect to the general axis of symmetry z–z' of box 2 are disposed on the path of light beams 14, 16 after the latter have been reflected on the carriageway and before they reach photo-sensors 44, 46.

FIGS. 8a–8c are schematic respectively face and cross-sectional views, along lines A–A' and B–B', of a path drift detection box according to a second embodiment of the invention. According to this second embodiment, box 2 encloses only one light source 40 (see FIG. 8b) which emits a primary light beam that is split into two secondary light beams 4, 6, guided onto the carriageway in two distinct zones that do not overlap. However, box 2 still encloses two photo-sensors 44 and 46 (FIG. 8c) and the second optical devices 36 and 38b which are associated therewith. Thus, in this case also, a single photo-sensor corresponds to one light spot on the carriageway.

Finally, FIGS. 9a–9c are respectively schematic face and cross-sectional views, along lines A–A' and B–B', of a path drift detection box according to a third embodiment of the invention. According to this third embodiment, case 2 encloses (see FIG. 9b) two light sources 40 and 42 which each emit a light beam 4, 6 in the direction of the carriageway, and the first two optical devices 32b and 34b associated with said light sources 40 and 42. However, box 2 only encloses one photo-sensor 44 (FIG. 9c), the second two optical devices 36b and 38b having, in this case, the role of directing light beams 14, 16 towards the single photo-sensor 44 after said beams 14, 16 have been reflected onto the carriageway. This solution is economical because it only uses a single photo-sensor. It will, of course, be understood, that the two light sources 40 and 42 will not have to be switched on simultaneously for the photo-sensor to be able to distinguish the light originating alternately from one and the other of these two light sources.

It goes without saying that the invention is not limited to the embodiments that have just been described and that various simple modifications and variants can be envisaged without departing from the scope of the invention. In particular, one could envisage arranging walls pierced with a hole obliquely in front the optical source or sources.

The invention claimed is:

1. A device for detecting crossing of a horizontal lane demarcation mark of a carriageway for motor vehicles, wherein the device includes:
    (a) at least one box to be placed under a vehicle and enclosing master and slave means for projecting two light beams onto a carriageway in two distinct zones; and
    (b) distinct means for picking up each of the two light beams after reflection onto the carriageway.

2. The detection device according to claim 1, wherein the at least one box, exhibiting a general axis of symmetry encloses
    i. a single light source emitting a primary light beam in the direction of the carriageway;
    ii. at least one photo-sensor for detecting the light after reflection on the carriageway;

iii. two first optical devices whose optical axes are inclined at a first value with respect to the general axis of symmetry of the box, each of the two first optical devices disposed on a path of the primary light beam as the primary light beam exits the optical source so as to split said primary light beam into two secondary light beams projected onto the carriageway in two distinct zones; and iv. two second optical devices whose optical axes are inclined at a second value with respect to the general axis of symmetry of the box are disposed on the path of the secondary light beams after the secondary light beams have been reflected onto the carriageway and before the secondary light beams reach the at least one photo-sensor.

3. The detection device according to claim 2, wherein the first two optical devices and the second two optical devices each include at least one lens.

4. The device according to claim 3, wherein the lenses are revolution lenses or do not exhibit axial symmetry.

5. The detection device according to claim 4, wherein the lenses are of the mineral type.

6. The detection device according to claim 4, wherein the lenses are of the organic type.

7. The detection device according to claim 3, wherein the lenses are of the mineral type.

8. The detection device according to claim 3, wherein the lenses are of the organic type.

9. The detection device according to claim 8, wherein the optical unit includes a base on which two optical transmission tubes stand and two optical reception tubes.

10. The detection device according to claim 9, wherein the body of the box has cavities for receiving the transmission tubes and reception tubes of the optical unit.

11. The detection device according to claim 3, wherein the box includes a body and an optical unit which carries the lenses.

12. The detection device according to claim 11, wherein the lenses are individually mounted on the optical unit.

13. The detection device according to claim 11, wherein the lenses are integral with the optical unit.

14. The detection device according to claim 2, wherein the light sources include light emitting diodes emitting in the infrared range.

15. The detection device according to claim 2, wherein the light sources and the photo-sensors are mounted by SMD or flip-chip on a printed circuit board.

16. The device according to claim 2, wherein the first two optical devices and the second two optical devices include a screen disposed obliquely in front of the light sources and pierced with a hole.

17. The detection device according to claim 1, wherein the at least one box, exhibiting a general axis of symmetry encloses i. two light sources each emitting a light beam in the direction of the carriageway;

ii. at least one photo-sensor for detecting the light after reflection on the carriageway;

iii. two first optical devices whose optical axes are inclined at a first value with respect to the general axis of symmetry of the box, each one of the first two optical devices disposed on a path of one of the light beams as the one light beam exits the corresponding optical source so as to project said two light beams onto the carriageway in two distinct zones; and iv. two second optical devices whose optical axes are inclined at a second value with respect to the general axis of symmetry of the box are disposed on the path of the light beams after the light beams have been reflected onto the carriageway and before the light beams reach the at least one photo-sensor.

18. The detection device according to claim 17, wherein the first two optical devices and the second two optical devices each include at least one lens.

19. The device according to claim 18, wherein the lenses are revolution lenses or do not exhibit axial symmetry.

20. The detection device according to claim 19, wherein the lenses are of the mineral type.

21. The detection device according to claim 19, wherein the lenses are of the organic type.

22. The detection device according to claim 18, wherein the lenses are of the mineral type.

23. The detection device according to claim 18, wherein the lenses are of the organic type.

24. The detection device according to claim 18, wherein the box includes a body and an optical unit which carries the lenses.

25. The detection device according to claim 24, wherein the lenses are individually mounted on the optical unit.

26. The detection device according to claim 24, wherein the lenses are integral with the optical unit.

27. The detection device according to claim 17, wherein the light sources include light emitting diodes emitting in the infrared range.

28. The detection device according to claim 1, wherein the light beams are focussed at the surface of the carriageway.

29. A device for detecting crossing of a horizontal lane demarcation mark of a carriageway for motor vehicles, wherein the device includes:

(a) at least one box to be placed under a vehicle and enclosing master and slave means for projecting two light beams onto a carriageway in two distinct zones; and (b) distinct means for picking up each of the two light beams after reflection onto the carriageway, wherein the at least one box, exhibiting a general axis of symmetry, encloses i. two light sources each emitting a light beam in the direction of the carriageway;

ii. at least one photo-sensor for detecting light after reflection on the carriageway;

iii. two first optical devices whose optical axes are inclined at a first value with respect to the general axis of symmetry of the box, each of the two first optical devices disposed on a path of one of the light beams as the one light beam exits the corresponding optical source so as to project the two light beams onto the carriageway in two distinct zones; and iv. two second optical devices whose optical axes are inclined at a second value with respect to the general axis of symmetry of the box are disposed on the path of the light beams after the light beams have been reflected onto the carriageway and before the light beams reach the at least one photo-sensor, wherein the light sources and the photo-sensors are mounted by SMD or flip-chip on a printed circuit board.

30. A device for detecting crossing of a horizontal lane demarcation mark of a carriageway for motor vehicles, wherein the device includes:

(a) at least one box to be placed under a vehicle and enclosing master and slave means for projecting two light beams onto a carriageway in two distinct zones; and (b) distinct means for picking up each of the two light beams after reflection onto the carriageway, wherein the at least one box, exhibiting a general axis of symmetry, encloses
  i. two light sources each emitting a light beam in the direction of the carriageway;
  ii. at least one photo-sensor for detecting light after reflection on the carriageway;
  iii. two first optical devices whose optical axes are inclined at a first value with respect to the general axis of symmetry of the box, each of the two first optical devices disposed on a path of one of the light beams as the one light beam exits the corresponding optical source so as to project the two light beams onto the carriageway in two distinct zones; and
  iv. two second optical devices whose optical axes are inclined at a second value with respect to the general axis of symmetry of the box are disposed on the path of the light beams after the light beams have been reflected onto the carriageway and before the light beams reach the at least one photo-sensor, wherein the first two optical devices and the second two optical devices include a screen disposed obliquely in front of the light sources and pierced with a hole.

* * * * *